United States Patent
Moran et al.

(10) Patent No.: US 9,688,888 B2
(45) Date of Patent: Jun. 27, 2017

(54) INTRUSION RESISTANT GLASS LAMINATES

(75) Inventors: James R. Moran, Longmeadow, MA (US); Jun Lu, East Longmeadow, MA (US); Julia C. Schimmelpenningh, North Brookfield, MA (US)

(73) Assignee: Solutia Inc., St. Louis, MO (US)

( * ) Notice: Subject to any disclaimer, the term of this patent is extended or adjusted under 35 U.S.C. 154(b) by 593 days.

(21) Appl. No.: 13/614,775

(22) Filed: Sep. 13, 2012

(65) Prior Publication Data

US 2013/0224456 A1 Aug. 29, 2013

Related U.S. Application Data

(63) Continuation of application No. 11/095,103, filed on Mar. 31, 2005, now abandoned, which is a continuation of application No. 09/737,234, filed on Dec. 14, 2000, now abandoned.

(60) Provisional application No. 60/170,688, filed on Dec. 14, 1999.

(51) Int. Cl.
| | |
|---|---|
| *B32B 17/10* | (2006.01) |
| *C09J 7/02* | (2006.01) |
| *B32B 27/36* | (2006.01) |
| *B32B 17/06* | (2006.01) |

(52) U.S. Cl.
CPC ........... *C09J 7/0239* (2013.01); *B32B 17/064* (2013.01); *B32B 17/10* (2013.01); *B32B 17/10036* (2013.01); *B32B 17/10174* (2013.01); *B32B 17/10761* (2013.01); *B32B 27/36* (2013.01); *Y10T 428/24942* (2015.01); *Y10T 428/24959* (2015.01); *Y10T 428/266* (2015.01); *Y10T 428/3163* (2015.04); *Y10T 428/31786* (2015.04); *Y10T 428/31942* (2015.04)

(58) Field of Classification Search
CPC ... B32B 17/10; B32B 2367/00; B32B 17/064; B32B 17/10036; B32B 17/10174; B32B 17/10761; B32B 27/36; Y10T 428/24942; Y10T 428/24959; Y10T 428/266; Y10T 428/3163; Y10T 428/31786; Y10T 428/31942
USPC ........ 428/212, 426, 430, 437, 441, 480, 483
See application file for complete search history.

(56) References Cited

U.S. PATENT DOCUMENTS

| | | |
|---|---|---|
| 3,437,552 A | 4/1969 | Bowen |
| 5,091,258 A | 2/1992 | Moran |
| 5,227,241 A | 7/1993 | Chaussade et al. |
| 5,796,055 A | 8/1998 | Benson, Jr. et al. |
| 5,932,329 A | 8/1999 | Frost et al. |

*Primary Examiner* — Aaron Austin
*Assistant Examiner* — Lawrence Ferguson
(74) *Attorney, Agent, or Firm* — Michelle Bugbee (57) ABSTRACT

Composite laminate interlayers for adhering a glass laminate comprising a sheet of polyethylene terephthalate (PET) between layers of plasticized polyvinyl butyral (PVB) adhesive layers, wherein at least one of the PVB adhesive layers is stiffened, e.g. by reduction in the amount of plasticizer, and has a glass transition temperature greater than 35° C. The PET is preferably 0.075 to 0.25 mm (3-10 mils) thick and can have a functional coating for reducing radiation, e.g. UV or IR or visible light, transmission through the glass laminate. The laminate can also comprise at least one elastomeric layer adapted to reducing sound transmission through the glass laminate. The laminates exhibit enhanced maximum flexural modulus of greater than about 350 Newtons/centimeter.

20 Claims, 5 Drawing Sheets

INTRUSION RESISTANT GLASS LAMINATES

CROSS REFERENCE TO RELATED APPLICATION(S)

This application is a continuation of co-pending U.S. application Ser. No. 11/095,103 filed Mar. 31, 2005 which is in turn a continuation of U.S. application Ser. No. 09/737,234, filed Dec. 14, 2000, which in turn claims priority from U.S. Provisional Application Ser. No. 60/170,688 filed Dec. 14, 1999. The entire disclosure of all the above applications is incorporated herein by reference.

BACKGROUND

1. Field of the Invention

Disclosed herein are intrusion resistant glass laminates and composite interlayers comprising enhanced modulus polyvinyl butyral (PVB) adhesive for making glass laminates which are especially useful as intrusion resistant glazing for architectural and automotive applications.

2. Description of Related Art

Automobile and home owners, especially those who have experienced a vehicle break-in or theft or hurricane damage, are increasingly interested in intrusion resistant glazing. Glass has been identified as the weak link in the overall intrusion resistance of vehicles and buildings. For instance, some police reports estimate that broken glass is the entry route for at least 60% of unauthorized entry into passenger vehicles. There is also a belief that a 10 second delay in entry is sufficient to discourage many spontaneous thieves because the increased break-in time and additional noise call attention to the thief. In response car makers, at least, are replacing traditional tempered glass with laminated glass for side and rear glazing for enhanced security. Common automotive laminated glass can be defeated by determined thieves who use more sophisticated tools to puncture by impact and pull laminated glass out from its frame.

Attempts to improve the performance of glass laminates include modifying the stiffness and/or impact resistance of the PVB interlayer. In U.S. Pat. No. 4,814,529 Cartier et al. disclose lightly cross-linking PVB resin to selectively increase molecular weight of the PVB and the modulus of a plasticized sheet formed therefrom for use in laminated safety glass assemblies. Cartier et al. do not disclose values of modulus or construction of laminates. In U.S. Pat. No. 5,246,764 LaPorte et al. disclose laminated glazing with improved impact strength where mean break height for a dropped mass of a glass laminate increased by dispersing adhesion resistant means on the surface of PVB sheet. In U.S. Pat. No. 5,482,767 Karagiannis et al. discloses glass laminates of improved impact resistance comprising a PVB interlayer having discrete particles of crosslinked polyvinyl butyral integrally randomly dispersed throughout a matrix of PVB.

Interlayer composites of polyethylene terephthalate (PET) between layers of PVB adhesive have been used in automotive glass laminates where a thin layer of the PET, e.g. typically up to about 0.05 millimeter (2 mils) thick, has been used as a carrier for additional functional layers, e.g. of solar radiation blockers or for antennas or heat strips. See for instance, U.S. Pat. Nos. 5,208,080 and 5,979,932. U.S. Pat. No. 5,091,258 discloses composite interlayer with a 0.013 to 0.20 mm thick PET sheet coated with a multi-layer stack of infrared solar radiation reflecting materials between PVB layers. U.S. Pat. Nos. 4,017,661 and 4,768,783 disclose a composite interlayer comprising a PET sheet where a thin sheet of the PET is used as a carrier for metal layers which can be electrically resistance heated for defrosting the glass laminate. U.S. Pat. No. 4,973,511 discloses a laminated glass window construction comprising a solar control film where the glass interlayer comprised a PET sheet having on one surface at least one thin coating of metal and at least one adjacent layer of a dielectric material between layers of PVB; in the examples there is disclosed the use of a 4 mil PET film between 15 mil layers of plasticized PVB.

U.S. Pat. Nos. 5,024,895 and 5,091,258 disclose glass laminates comprising a composite interlayer where the tensile modulus for PET (at 21-15 C) is about $10^{10}$ Pa as compared with about $10^7$ Pa for plasticized PVB of the type used in safety glazing.

An object of this invention is to provide a more intrusion resistant glass laminate, e.g. for use in security glazing applications such as architectural and automotive glazing. This is achieved by using composite interlayers comprising rigid plastic sheet and/or stiffened PVB adhesive layers providing a higher laminate stiffness.

SUMMARY

This invention provides a composite laminate interlayer for use in manufacturing intrusion resistant glass laminates having a higher laminate stiffness. Such laminates comprise an interlayer having at least one layer of high stiffness, plasticized PVB. In one aspect of the invention high stiffness in plasticized, PVB is advantageously provided by reducing the level of plasticizer as indicated by a rise in glass transition temperature (Tg) of the plasticized PVB, e.g. about 2 to 3° C. above typical values for a commercial application. For instance, for automotive applications, where plasticized PVB sheet typically has a Tg of about 30-33° C., high stiffness PVB of this invention will have a Tg of at least 35° C. Glass laminates of this invention preferably have a maximum flexural modulus of at least 350 Newtons/centimeter (N/cm).

Another aspect of this invention provides a composite laminate interlayer comprising a layer of PET between layers of plasticized PVB adhesive where at least one of the PVB layers exhibits enhanced stiffness. Preferably, the PET has a thickness in the range of 0.125 to 0.254 millimeters (5-10 mils). Another aspect of this invention provides interlayer composites with other functional layers, e.g. sound dampening elastomer layers or radiation blocking layers.

Another aspect of this invention provides intrusion resistant glass laminates comprising a composite interlayer of this invention exhibiting high stiffness of at least 350 N/cm. Other aspects of the invention will be clear from the following detailed description of preferred embodiments.

DESCRIPTION OF THE PREFERRED EMBODIMENT(S)

As used herein the term "flexural modulus" of a laminate is slope of the "load v. displacement" curve defined as the measured load, e.g. expressed in Newtons (N), of 180 mm diameter hemispherical ram is driven into the laminate at a speed of 125 mm/minute per distance of ram penetration, e.g. expressed in centimeters (cm), before failure or yield, e.g. as determined by a reduction in load with increased penetration.

As used herein the term "maximum flexural modulus" of a laminate is defined as the highest slope of the "load v. displacement" curve over a range of 2 centimeters of ram displacement before failure.

Figure 1:
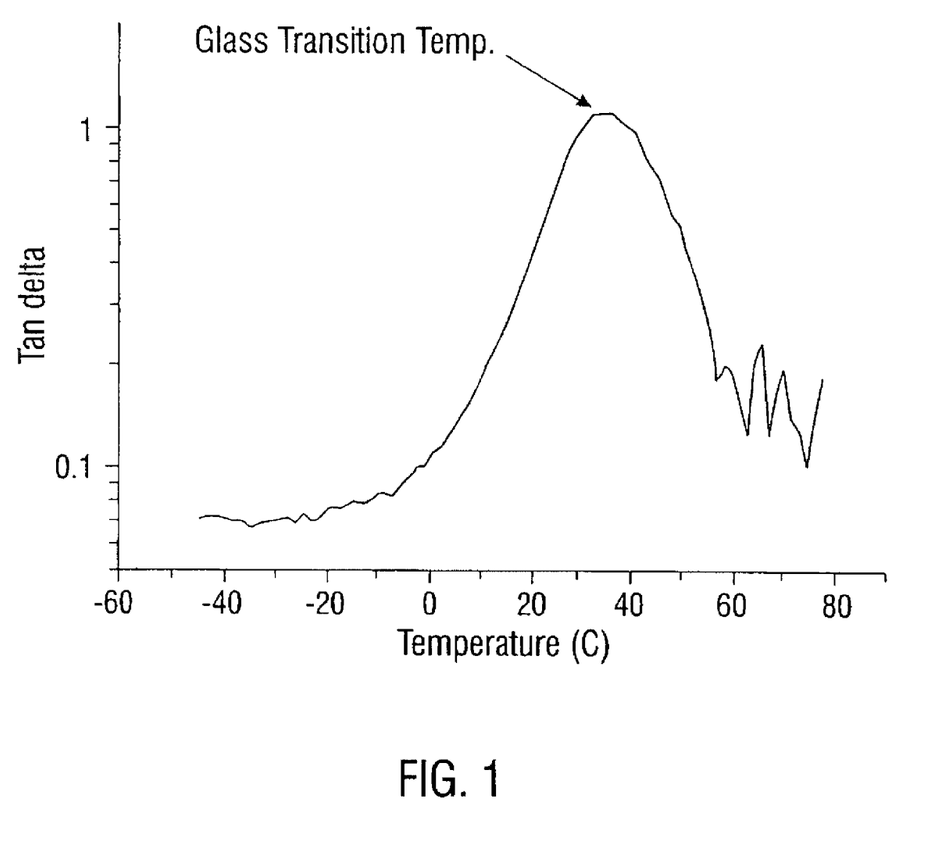
FIG. 1 is a typical plot of tan delta v. temperature used to determine glass transition temperature of plasticized PVB.

As used herein glass transition temperature (Tg) of plasticized PVB is determined by rheometric dynamic analysis using the following procedure. Plasticized PVB sheet is molded into a sample disc of 25 millimeters (mm) in diameter. The PVB sample disc is placed between two 25 mm diameter parallel plate test fixtures of a Rheometrics Dynamic Spectrometer II. The PVB sample disc is tested in shear mode at an oscillation frequency of 1 Hertz as the temperature of the PVB sample is increased from −20 to 70° C. at a rate of 2° C./minute. The position of the maximum value of tan delta (damping) plotted as dependent on temperature is used to determine Tg as illustrated in FIG. 1. Experience indicates that the method is reproducible to within +/−1° C. Commercially used PVB typically has a Tg in the range of 30-33° C.

PVB resin is produced by known aqueous or solvent acetalization processes reacting PVOH with butyraldehyde in the presence of acid catalyst, followed by neutralization of the catalyst, separation, stabilization and drying of the resin. It is commercially available from Solutia, Inc. as Butvar® resin. PVB resin typically has a weight average molecular weight greater than 70,000, preferably about 100,000 to 250,000, as measured by size exclusion chromatography using low angle laser light scattering. On a weight basis PVB typically comprises less than 22%, preferably about 17 to 19% hydroxyl groups calculated as polyvinyl alcohol (PVOH); up to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

The PVB resin of the sheet is typically plasticized with about 20 to 80 and more commonly 25 to 45 parts plasticizer per hundred parts of resin. Plasticizers commonly employed are esters of a polybasic acid or a polyhydric alcohol. Suitable plasticizers are triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers. A more preferred plasticizer is ethylene glycol di(2-ethylhexanoate). The amount of plasticizer used is a convenient means to modifying and controlling the stiffness of the PVB. A useful surrogate property for stiffness is Tg which is directly related to the level of plasticizer. The plasticized PVB sheet used in the laminates of this invention will have a Tg of at least 35° C. or higher, i.e. at least 37° C., preferably at least 39° C. or higher, i.e. at least 41° C., and most preferably at least 43° C. or higher, i.e. at least 45° C.

The high Tg PVB of this invention will have a sufficiently low tackiness at typical processing conditions to inherently avoid undesired adhesion, e.g. in stacks of PVB, prior lamination. Since the laminates of this invention will comprise at least one layer of enhanced stiffness PVB, it is expected that at least one or more other layers of PVB could comprise standard, commercially-used, plasticized PVB of traditional stiffness and Tg. Such standard PVB typically has a Tg in the range of 32-33° C. and is sufficiently inherently tacky as require the use of an adhesion control agent to reduce tackiness to facilitate stacking of PVB layers with minimal adhesion prior to construction of a laminate. Useful adhesion control agents are disclosed in U.S. Pat. Nos. 5,342,653 and 5,547,736 (anti-adhesion projections), U.S. Pat. No. 4,999,078 (the addition of ionomer groups), U.S. Pat. No. 5,618,863 (the addition of multivalent, metal salt of an organic acid, e.g. magnesium 2-ethyl butyrate, as an adhesion control agent) and U.S. Pat. Nos. 5,425,977, 5,455, 103 and 5,595,818 (use of a non-uniform surface).

As disclosed in U.S. Pat. No. 5,618,863 it is also often useful or desirable to incorporate a UV absorber in PVB. In addition to plasticizer, optional UV absorber and adhesion control agent, PVB sheet may contain other performance-enhancing additives such as pigments or dyes for coloring all or part of the sheet, antioxidants and the like. PVB sheet is prepared by mixing combined plasticizer and other additives (e.g. UV-absorber, adhesion control agent and the like) with PVB resin and forcing the mixture under pressure through a die opening to form a sheet. Thickness of the extruded sheet can range from 0.13 to 2 mm, typically about 0.4 to about 1.6 mm thick to provide the desired performance in the glass laminate.

PET sheet for use in the composite interlayer of this invention is preferably biaxially stretched to improve strength and has been heat stabilized to provide low shrinkage characteristics when subjected to elevated temperatures (i.e. less than 2% shrinkage in both directions after 30 min. at 150° C.). The tensile modulus (at 21-25° C.) of polyethylene terephthalate is about $10^{10}$ Pa as compared with about $10^7$ Pa for plasticized polyvinyl butyral of the type used in safety glazings. To facilitate bonding of PVB to PET a coating and/or surface treatment can be applied to PET film as disclosed in European Patent 157030 B1, and U.S. Pat. No. 4,732,814, incorporated herein by reference, which discloses plasma treatment of biaxially stretched polyester to improve adhesion. A preferred method for treating the surface of PET film includes deposition of a thin layer of carbon by vacuum sputtering as disclosed by Kittler in U.S. Pat. No. 4,865,711 (incorporated herein by reference).

Composite interlayers according to this invention are prepared by known procedures. See for instance, U.S. Pat. Nos. 4,973,511, 5,024,895 and 5,091,258 (incorporated herein by reference) for methods for laminating plasticized PVB to surface-treated PET sheet. Because final bonding conditions will be experienced when the interlayer is bonded to glass, the degree of bonding of PVB to PET in the composite interlayer is not critical. Because at least one layer of plasticized PVB in the composite interlayers of this invention will have a Tg higher than convention, a person of ordinary skill in the art will appreciate a need to raise the processing temperature of the PVB sheet by an amount corresponding to the elevation in Tg. Suitable temperatures for bonding PVB to PET will typically be in the range of 50 to 120° C. The PET/PVB composites can be pressed, e.g. in a nip roller, to improve adhesion.

Glass laminates using sheets of the invention are prepared by known procedures, e.g. as disclosed in U.S. Pat. Nos. 5,024,895; 5,091,258; 5,145,744; 5,189,551; 5,264,058 and 5,529,654 (all of which are incorporated herein by reference). Composite interlayer is placed between two sheets of glass and heated under vacuum to a temperature in the range of about 85 to 120° C. for about 10 to 30 minutes, depending on temperature, to remove air from between the layers of the laminate. After de-airing the laminate is preferably heated in an autoclave at elevated temperature (about 90 to 165° C.) and pressure (about 1000 to 2000 kPa) for sufficient time to firmly bond the layers of the laminate. Non-autoclave methods as disclosed in U.S. Pat. No. 5,536,347 may are also useful, e.g. for plasticized PVB having only moderate increases in Tg.

Figure 2:
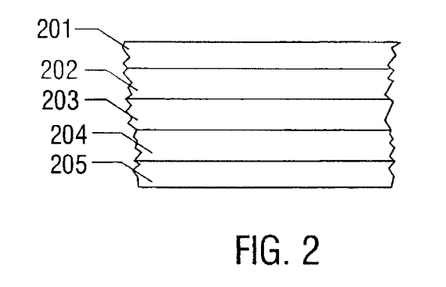
FIGS. 2, 3, and 4 are schematic sectional views of glass laminates according to the invention.

Referring to FIG. 2 a glass laminate comprises glass sheets 201 and 205 which can comprise float glass or tempered glass typically in the range of 1 to 20 millimeters (mm) thick, preferably in the range of 1-10 mm thick. Between and bonded to the glass sheets is a composite interlayer comprising a PET sheet 203 between layers of plasticized PVB adhesive 202 and 204. The PET sheet is biaxially-oriented and can be in the range of 0.025 to 0.25 mm thick (1 to 10 mils), preferably at least 0.125 mm thick. For desired adhesion to the PVB, the surface of the PET is preferably modified, e.g. by roughening of the surface or by chemical modification of the material at the surface. Such modification can be effected by flame treatment, chemical oxidation, corona discharge, carbon sputtering, plasma treatment in vacuum or in air or other treatments well known to those of ordinary skill in the art. A preferred surface treatment is plasma treatment in air. The PVB is plasticized, most preferably with triethylene glycol di(2-ethylhexanoate), in an amount to provide a Tg of at least 35 C. In the laminates of this invention layers 202 and 204 can be similar, e.g. comprise plasticized PVB having a Tg of at least 35° C. Alternatively, layers 202 and 204 can be different, e.g. plasticized PVB layer 202 can comprise a conventional PVB layer having a Tg of about 33° C. and PVB layer 202 can comprise a toughened PVB layer having a Tg of at least 35° C.

With further reference to FIG. 2 in alternative embodiments of the invention the PET layer 203 can be replaced with an alternative high modulus layer such as a plasticized PVB sheet with higher stiffness than the PVB comprising layers 202 and 204. Alternatively, layer 203 can be substituted with a thick, e.g. up to 1 to 2 mm, sheet of plasticized PVB having a Tg of about 33° C. with layers 202 and 204 comprising plasticized PVB having a Tg of 35° C. or higher. In a further alternative embodiment, one or both of the plasticized PVB layers 202 and 204 can be composites of high modulus and low modulus plasticized PVB, e.g. a sheet of plasticized PVB having a Tg of about 33° C. adhered to a sheet of PVB having a Tg of 35° C. or higher. Such composites when used in an interlayer having a PET sheet provide a balance of properties such as modulus and toughness over a wider temperature range of use than a monolithic sheet.

In yet another embodiment of this invention any or all of the plasticized PVB layers can comprise a composite of high and low stiffness plasticized PVB, e.g. a layer of about 0.4 to 1.6 mm thick having a Tg of about 33° C. adhered to a layer of about 0.25 to 1.6 mm thick having a Tg of 35° C. or higher. The orientation of such composite layers of plasticized PVB in the glass composite can vary. Accordingly, in some cases it is preferred to orient composite plasticized PVB layers with the high modulus plasticized PVB in contact with the glass. In other cases it may be preferred to have the low modulus plasticized PVB in contact with the glass.

Figure 3:
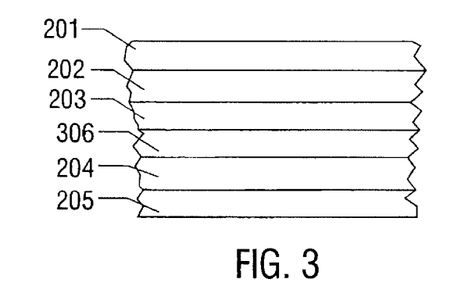

In FIG. 3 there is shown an alternative embodiment where the laminate further comprises a an additional layer 306 which can be a sound attenuating elastomer layer as disclosed in U.S. Pat. No. 5,796,055 (incorporated herein by reference) or a radiation blocking layer, e.g. comprising a composite of one or more layers of metal or metal oxide deposited onto the PET layer as disclosed in any of U.S. Pat. Nos. 5,024,895, 5,091,258 or 5,932,329 (the disclosures of all four patents being incorporated herein by reference).

Figure 4:
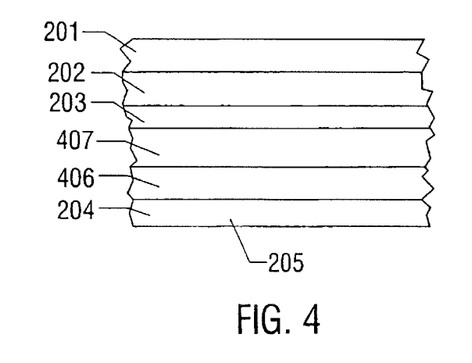

In FIG. 4 there is shown another alternative embodiment where the laminate comprises additionally comprises both a sound attenuating elastomer layer 406 and separate a radiation blocking layer 407, e.g. comprising a stack of metal and/or metal oxide layers deposited onto the PET layer 203.

Figure 5A:
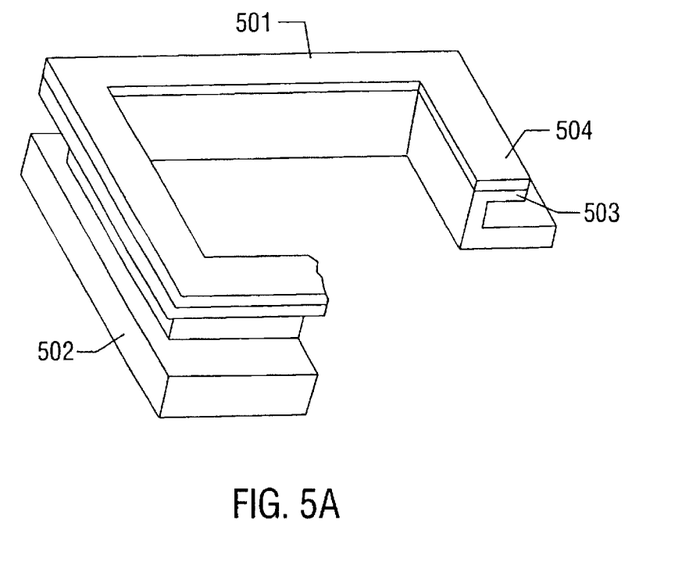
FIGS. 5A and 5B illustrates a mounting frame for testing glass laminates according to this invention.
Figure 5B:
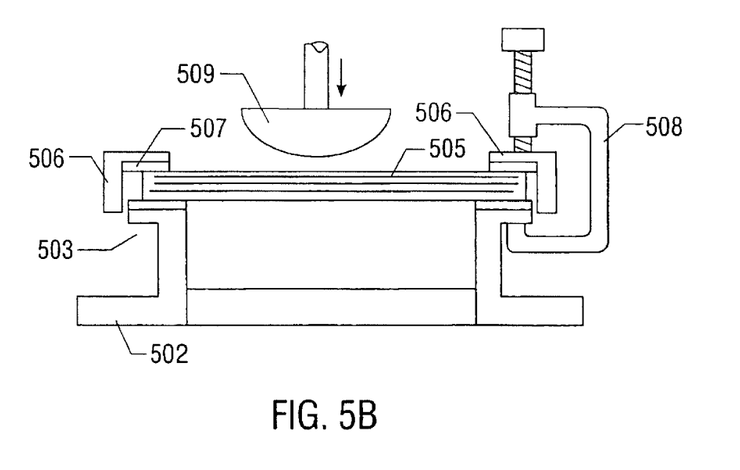
Figure 6:
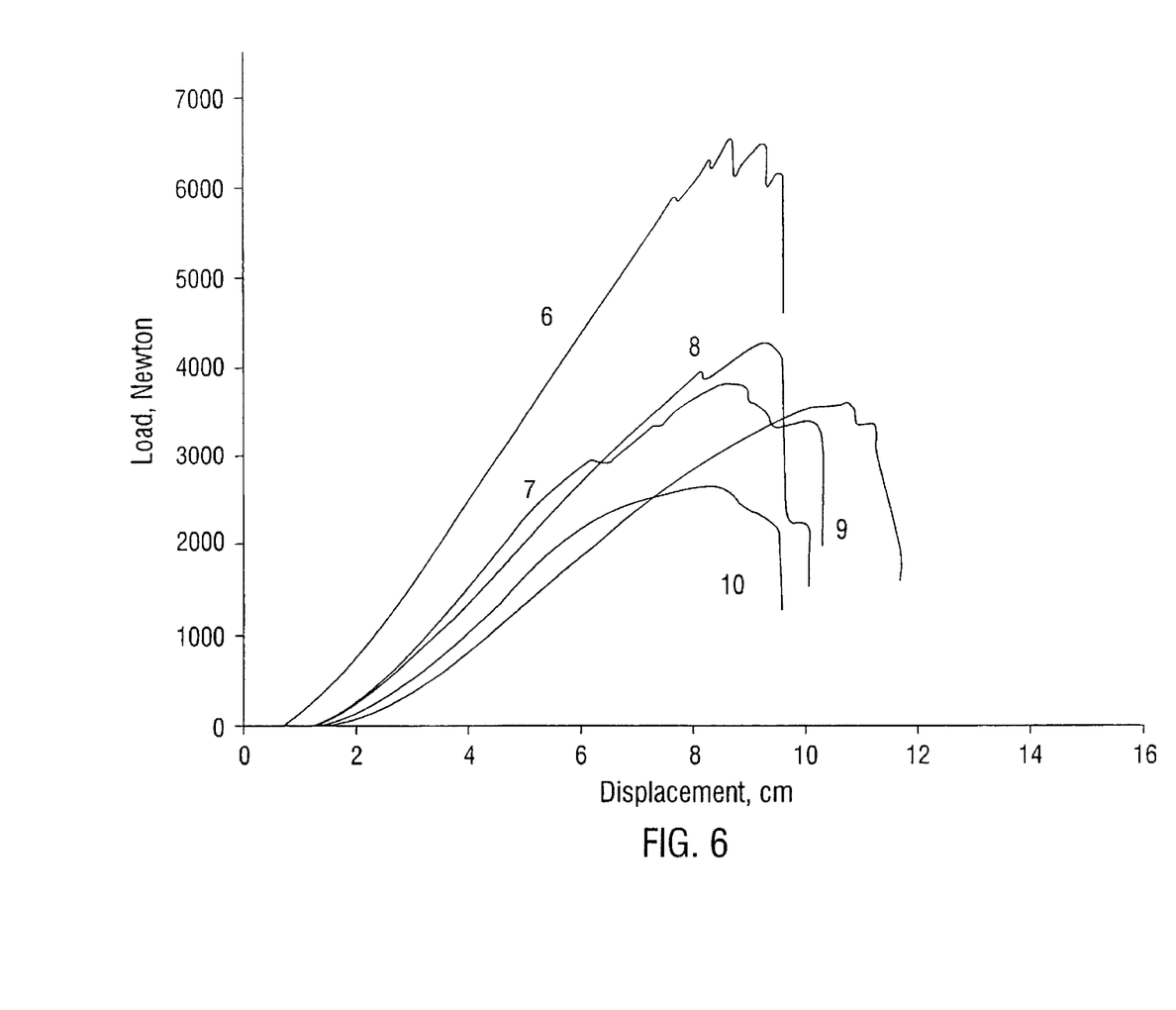
FIGS. 6 and 7 are graphical representations of "load v. displacement" response determined from a ram penetrating a glass laminate of this invention; such "load v. displacement" curve is useful for determining flexural modulus.
Figure 7:
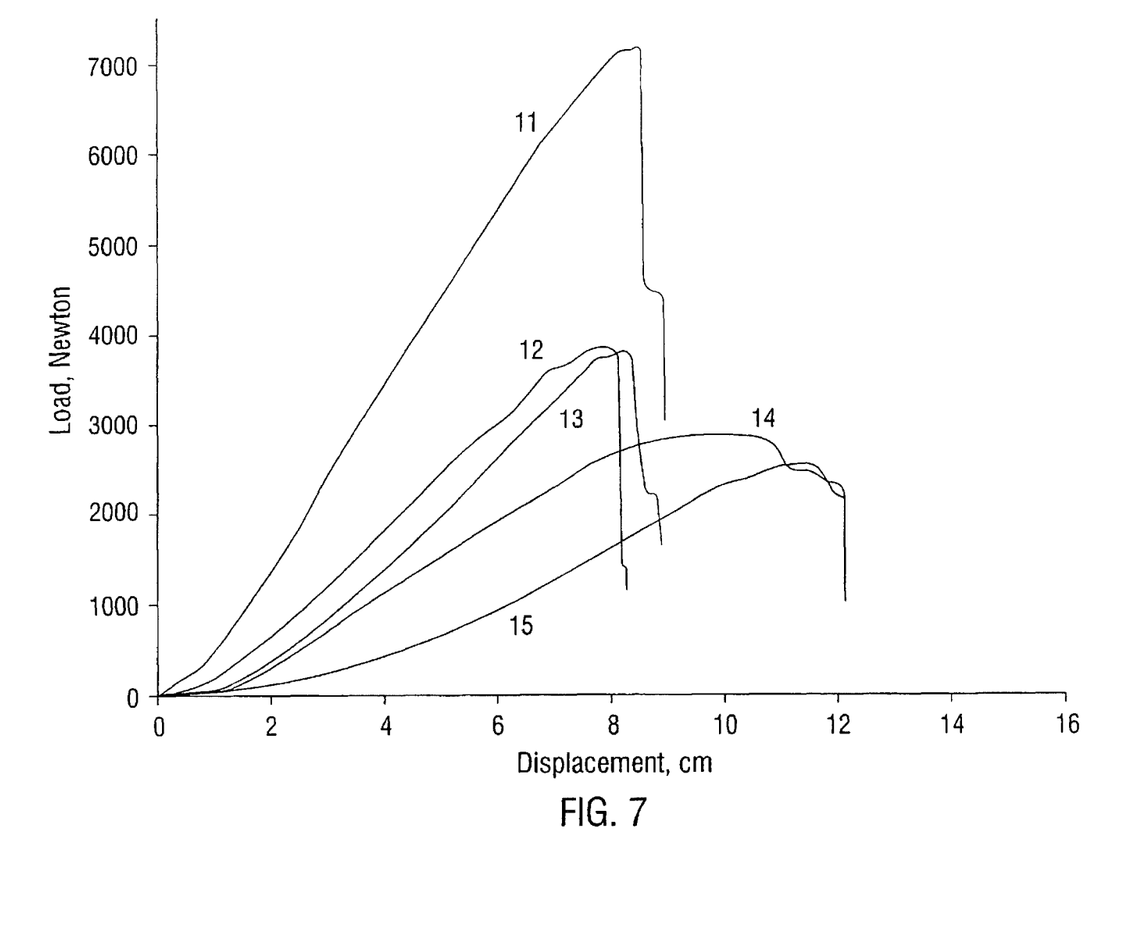

FIGS. 5A and 5B show a test frame 501 comprising a rectangular base 502 having a rectangular opening and supporting beams 503 which are covered with 3 mm thick rubber strips 504. A sheet of laminated glass 505 having overall dimensions of 45×60 cm (18×24 in) will rest on the support beams 503 with an 11 mm bite. Four angle-shaped holders 506 with a 3 mm thick rubber coating 507 overlap the top edge of the glass laminate with a 5-6 mm bite on all four edges of the glass laminate. Each holder 506 is secured to the frame by two C-clamps 508 (one of eight is shown) located at a distance from each corner equivalent to about one-fourth of the length of the side of the laminate. The frame is positioned below a 180 mm diameter hemispherical ram head 509 which is driven into the glass laminate at a speed of 125 mm/minute. The load and distance of ram travel from impact with the glass laminate is recorded to generate a "load v. displacement" response curve as illustrated in FIGS. 6 and 7. The ratio of load to ram displacement represents flexural modulus of the laminate.

The following Examples illustrate and do not limit or restrict the invention and are illustrated using the following materials.

3GEH: triethylene glycol di(2-ethylhexanoate) plasticizer
Glass: 2.2 mm thick annealed float glass.
PET1: 0.1 mm (4 mil) thick PET sheet, biaxially oriented and carbon sputtered.
PET2: 0.177 mm (7 mil) thick PET sheet, biaxially oriented and carbon sputtered.
PVB1: 0.38 mm (15 mil) thick plasticized PVB containing 38 phr 3GEH and having a Tg of about 32° C.
PVB2: 0.76 mm (30 mil) thick plasticized PVB containing 38 phr 3GEH and having a Tg of about 32° C.
PVB3: 1.14 mm (45 mil) thick plasticized PVB containing 38 phr 3GEH and having a Tg of about 32° C.
PVB4: 1.52 mm (60 mil) thick plasticized PVB containing 38 phr 3GEH and having a Tg of about 32° C.
PVB5: 0.76 mm (30 mil) thick plasticized PVB containing 22 phr 3GEH and having a Tg of about 45° C.
PVB6: 0.38 mm (15 mil) thick plasticized PVB containing 30 phr 3GEH and having a Tg of about 38° C.
PVB7: 0.76 mm (30 mil) thick plasticized PVB containing 30 phr 3GEH and having a Tg of about 38° C.
IONOMER: 1.52 mm (60 mil) thick ionomer sheet obtained from E.I. DuPont de Nemours & Company under the trademark Surlyn SPK.

Examples 1-15

Glass laminates about 45×60 cm (18×24 in) were constructed of the materials indicated in Table 1.

TABLE 1

| Laminate No. | Layer Assembly |
| --- | --- |
| 1 | glass/PBV2/glass |
| 2 | glass/PVB3/glass |
| 3 | glass/PVB4/glass |
| 4 | glass/PVB1/PET2/PVB1/glass |
| 5 | glass/PVB5/PVB5/glass |
| 6 | glass/PVB7/PET2/PVB7/glass |
| 7 | glass/PVB6/PET2/PVB6/glass |
| 8 | glass/PVB7/PET1/PVB7/glass |
| 9 | glass/PVB2/PET1/PVB2/glass |
| 10 | glass/PVB6/PET1/PVB6/glass |
| 11 | glass/PVB5/PET2/PVB5/glass |
| 12 | glass/IONOMER/glass |
| 13 | glass/PVB2/PET2/PVB2/glass |
| 14 | glass/PVB5/glass |
| 15 | glass/PVB1/PVB5/PVB1/glass |

The laminates were evaluated for impact resistance by striking with a 9.5 kilogram hammerhead at the end of a 1400 mm pendulum arm from a drop height of 700 mm according to British Standard BS AU 209, Part 4a modified in that the glass laminate was mounted in a vertically oriented test frame of the type shown in FIG. 5A; the hammer was set to strike at five points of a diamond pattern measuring 70 mm on a square side (in sequence, the top, left center, center, right center and bottom). After hammer impact the laminates were deformed in the range of 2.5 to 35 mm (0.1 to 1.4 inches) with cracked glass but intact interlayer. After pendulum impact testing the laminates were subjected to ram head penetration testing to measure flexural modulus. The "load v. resistance" curves for the laminates of examples 6 to 15 are reported in FIGS. 6 and 7 as indicated by example number. The maximum flexural modulus for certain of the laminates in reported in Table 3.

TABLE 3

| Laminate No. | Maximum Flexural Modulus, N/cm |
| --- | --- |
| 1 | 166 |
| 2 | 218 |
| 3 | 253 |
| 4 | 662 |
| 5 | 615 |
| 6 | 956 |
| 7 | 730 |
| 8 | 687 |
| 9 | 589 |
| 10 | 626 |
| 11 | 1043 |
| 12 | 594 |
| 13 | 698 |
| 14 | 388 |
| 15 | 359 |

The preceding description is set forth for purposes of illustration only and is not to be taken in a limited sense. Various modifications and alterations will be readily apparent to persons skilled in the art. It is intended, therefore, that the foregoing be considered as exemplary only and that the scope of the invention be ascertained from the following claims.

The invention claimed is:

1. A composite laminate interlayer consisting essentially of a sheet of polyethylene terephthalate between two layers of plasticized polyvinyl butyral adhesive, wherein each of said plasticized polyvinyl butyral adhesive layers have a thickness in the range of 0.25 to 2 millimeters (10-80 mils) and wherein at least one of said polyvinyl butyral adhesive layers has a glass transition temperature greater than 35° C., and a maximum flexural modulus of at least 350 Newtons/centimeter.

2. An interlayer according to claim 1 wherein said plasticized polyvinyl butyral adhesive layers are of different thickness.

3. An interlayer according to claim 1 wherein said sheet of polyethylene terephthalate has a thickness greater than 0.075 millimeters (3 mils).

4. An interlayer according to claim 1 wherein said sheet of polyethylene terephthalate has a thickness greater than 0.1 millimeters (4 mils).

5. An interlayer according to claim 1 wherein said sheet of polyethylene terephthalate has a functional coating for reducing radiation transmission.

6. A composite laminate interlayer consisting essentially of a layer of polyethylene terephthalate between two layers of plasticized polyvinyl butyral adhesive layers, wherein said layer of polyethylene terephthalate has a thickness in the range of 0.125 to 0.254 millimeters (5-10 mils); and each of said plasticized polyvinyl butyral layers has a thickness in the range of 0.25 to 2 millimeter (10-80 mils) and wherein at least one layer of plasticized polyvinyl butyral has a glass transition temperature greater than 35° C., and a maximum flexural modulus of at least 350 Newtons/centimeter.

7. A glass laminate comprising in order:
   (a) a first glass sheet,
   (b) a first layer of plasticized polyvinyl butyral adhesive having a thickness in the range of 0.25 to 2 millimeters (10-80 mils),
   (c) a sheet of polyethylene terephthalate greater than 0.075 millimeters (3 mils) thick,
   (d) a second layer of plasticized polyvinyl butyral adhesive having a thickness in the range of 0.25 to 2 millimeter (10-80 mils), and
   (e) a second glass sheet, wherein said glass laminate exhibits a maximum flexural modulus of greater than about 350 Newtons/centimeter, and wherein at least one of the layers of plasticized polyvinyl butyral has a glass transition temperature greater than 35° C., and a maximum flexural modulus of at least 350 Newtons/centimeter.

8. A glass laminate according to claim 7 exhibiting a maximum load before failure of at least 3,000 Newtons.

9. A glass laminate according to claim 7 wherein at least one of said layers of plasticized polyvinyl butyral adhesive has a glass transition temperature greater than 40° C.

10. A glass laminate according to claim 7 wherein said sheet of polyethylene terephthalate has a radiation blocking coating.

11. A glass laminate consisting essentially of in order:
   (a) a first glass layer,
   (b) a first layer of plasticized polyvinyl butyral adhesive having a thickness in the range of 0.25 to 2 millimeters (10-80 mils),
   (c) a layer of polyethylene terephthalate,
   (d) a second layer of plasticized polyvinyl butyral adhesive having a thickness in the range of 0.25 to 2 millimeters (10-80 mils),
   (e) a second glass layer, wherein at least one of said layers of plasticized polyvinyl butyral adhesive has a glass transition temperature greater than 35° C., and a maximum flexural modulus of at least 350 Newtons/centimeter.

12. A glass laminate according to claim 11 wherein said glass laminate exhibits a maximum flexural modulus greater than about 350 Newtons/centimeter.

13. A glass laminate according to claim 11 wherein said glass laminate exhibits a maximum flexural modulus greater than about 450 Newtons/centimeter.

14. A glass laminate according to claim 11 wherein said glass laminate exhibits a maximum flexural modulus greater than about 550 Newtons/centimeter.

15. A glass laminate according to claim 11 wherein said glass laminate exhibits a maximum flexural modulus greater than about 650 Newtons/centimeter.

16. A glass laminate according to claim 11 wherein said glass laminate exhibits a maximum load before failure from a secured frame of at least 3,000 Newtons.

17. A glass laminate according to claim 11 wherein said glass laminate exhibits a maximum load before failure from a secured frame of at least 4,000 Newtons.

18. A glass laminate according to claim 11 wherein said glass laminate exhibits a maximum load before failure from a secured frame of at least 5,000 Newtons.

19. A glass laminate according to claim 11 wherein said glass laminate exhibits a maximum load before failure from a secured frame of at least 6,000 Newtons.

20. A glass laminate according to claim 11 wherein said layer of polyethylene terephthalate has a radiation blocking coating.

* * * * *